UNITED STATES PATENT OFFICE.

WILHELM HERZBERG, OF BERLIN-WILMERSDORF, AND OSWALD SCHARFENBERG, OF BERLIN-SCHONEBERG, GERMANY, ASSIGNORS TO ACTIEN GESELLSCHAFT FUR ANILIN FABRIKATION, OF BERLIN, GERMANY.

ORTHOOXYAZO DYES.

1,419,501.  Specification of Letters Patent.  Patented June 13, 1922.

No Drawing.  Application filed August 30, 1921. Serial No. 496,971.

*To all whom it may concern:*

Be it known that we, WILHELM HERZBERG and OSWALD SCHARFENBERG, citizens of the German Republic, residing at Berlin-Wilmersdorf, Germany, and Berlin-Schoneberg, Germany, our P. O. address being Prinzregentenstr. 10, Berlin-Wilmersdorf, Germany, and Rosenheimerstr. 12, Berlin-Schoneberg, Germany, have invented certain new and useful Improvements in Orthooxyazo Dyes, of which the following is a specification.

By our invention by combining a diazotized 2-aminophenol derivative which contains negative radicals such as halogen with 8-halogen-1-oxynaphthalene-5-sulfonic acid new valuable dyestuffs for wool are produced the chromium lakes having a very good fastness.

They form in the dry pulverized shape dark powders soluble in water to a blue solution and are insoluble in alcohol, ether, benzene, being destroyed by strong reducing agents and dyeing on wool with aid of chromium mordants blue tints.

The 2-aminophenol derivatives containing negative radicals such as halogen which may be employed are represented by the general formula

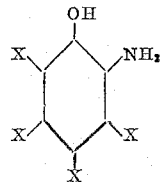

in which X stands for univalent substituents such as hydrogen, alkyl or halogen and at least one of these substituents is a negative group such as halogen.

The following examples illustrate our invention, the parts being by weight:

1. 17.8 parts of 2-amino-4.6-dichlorophenol are diazotized by means of 6.9 parts of sodium nitrite and 50 parts of hydrochloric acid of 12° Bé. specific gravity. The diazo compound is allowed to run into a solution of 25.9 parts of 8-chloro-1-oxynaphthalene-5-sulfonic acid, alkaline with sodium carbonate. The dyestuff is salted out and worked up as usual. It dyes wool with chromium mordants blue tints of a very good fastness.

2. The diazo compound of 21 parts of 3.4.6-trichloro-2-aminophenol is coupled with 26 parts of 8-chloro-1-oxynaphthalene-5-sulfonic acid in a solution containing sodium carbonate. The dyestuff dyes wool with chromium mordants blue.

It is obvious that our invention is not limited to the foregoing examples or to the details given therein. Similar dyes are obtained by substitution for the parent material in the foregoing examples other compounds within the foregoing definition.

What we claim is:—

1. The herein described new ortho-oxy-azo dyes being in the shape of alkali metal salts, dark powders soluble in water to blue solution from which an inorganic or organic acid separates a red precipitation, the aqueous blue solutions becoming violet by addition of sodium carbonate, red by addition of sodium hydroxide, yielding upon reduction 8-chloro-2-amino-1-naphthol-5-sulfonic acid and a 2-aminophenol derivative, dyeing on wool with chromium mordants blue tints of a very good fastness and corresponding as free acids to the general formula:

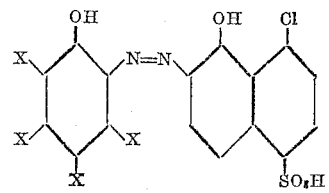

X meaning univalent substituents such as hydrogen, alkyl, halogen, at least one of these substituents being a negative group such as halogen.

2. The herein described new ortho-oxy-azo dyes being in the shape of alkali metal salts dark powders soluble in water to blue solutions from which an inorganic or organic acid separates a red precipitation, the aqueous blue solution becoming violet by addition or sodium carbonate, red by addition of sodium hydroxide, yielding upon reduction 8-chloro-2-amino-1-oxynaphthalene-5-sulfonic acid and a halogenated 2-amino-1-oxy-benzene derivative, dyeing on wool with chromium mordants blue tints of a very good fastness and corresponding as free acids to the general formula:

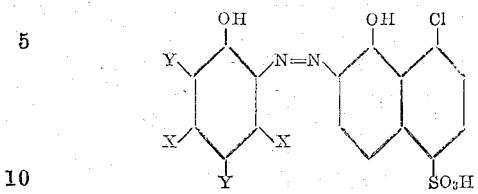

X meaning univalent substituents such as hydrogen, alkyl, halogen, Y meaning halogen.

3. The herein described ortho-oxy-azo dyes being in the shape of alkali metal salts dark powders soluble in water to blue solutions from which an inorganic or organic acid separates a red precipitation, the aqueous blue solution becoming violet by addition of sodium carbonate, red by addition of sodium hydroxide, yielding upon reduction 8-chloro-2-amino-1-oxynaphthalene-5-sulfonic acid and a 4.6-dichloro-2-amino-1-oxybenzene derivative, dyeing on wool with chromium mordants blue tints of a very good fastness and corresponding as free acids to the general formula:

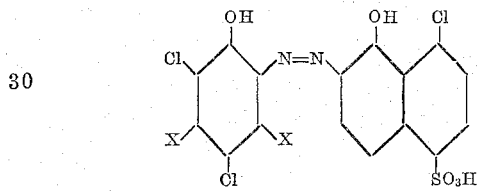

X meaning univalent substituents such as hydrogen, alkyl, halogen.

4. The herein described new ortho-oxy-azo dyes being in the shape of alkali metal salts dark powders soluble in water to blue solutions from which an inorganic or organic acid separates a red precipitation, the aqueous blue solution becoming violet by addition of sodium carbonate, red by addition of sodium hydroxide, yielding upon reduction 8-chloro-2-amino-1-oxynaphthalene-5-sulfonic acid and a 4.6-dichloro-2-amino-1-oxy-benzene derivative, dyeing on wool with chromium mordants blue tints of a very good fastness and corresponding as free acids to the formula:

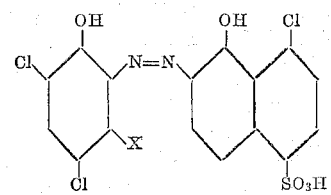

X meaning a univalent substituent such as hydrogen, alkyl, halogen.

5. The herein described ortho-oxy-azo-dye being in the shape of alkali metal salt a dark powder soluble in water to a blue solution from which an inorganic or organic acid separates a red precipitation, the aqueous blue solution becoming violet by addition of sodium carbonate, red by addition of sodium hydroxide, yielding upon reduction 8-chloro-2-amino-1-oxynaphthalene-5-sulfonic acid and 4.6-dichloro-2-amino-1-oxybenzene, dyeing on wool with chromium mordants blue tints of a very good fastness and corresponding as free acid to the formula:

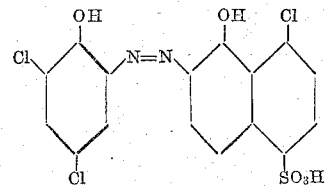

In testimony whereof we affix our signatures in presence of two witnesses.

WILHELM HERZBERG.
OSWALD SCHARFENBERG.

Witnesses:
 GERHARD HOPPE,
 RUDOLF HANGOVITZ.